US012643449B2

(12) United States Patent (10) Patent No.: US 12,643,449 B2
Ogiso et al. (45) Date of Patent: Jun. 2, 2026

(54) SEAT DRIVE DEVICE

(71) Applicant: AISIN CORPORATION, Kariya (JP)

(72) Inventors: Takashi Ogiso, Kariya (JP); Hidehiko Fujioka, Kariya (JP); Guyue Sun, Kariya (JP)

(73) Assignee: AISIN CORPORATION, Kariya (JP)

( * ) Notice: Subject to any disclaimer, the term of this patent is extended or adjusted under 35 U.S.C. 154(b) by 171 days.

(21) Appl. No.: 18/439,811

(22) Filed: Feb. 13, 2024

(65) Prior Publication Data

US 2024/0286539 A1 Aug. 29, 2024

(30) Foreign Application Priority Data

Feb. 27, 2023 (JP) ................................. 2023-028189
Dec. 18, 2023 (JP) ................................. 2023-212731

(51) Int. Cl.
B60N 2/90 (2018.01)
(52) U.S. Cl.
CPC ............... B60N 2/914 (2018.02); B60N 2/99 (2018.02)
(58) Field of Classification Search
CPC .......... B60N 2/99; B60N 2/914; B60N 2/986; B60N 2/22
USPC ...................................................... 297/284.9
See application file for complete search history.

(56) References Cited

U.S. PATENT DOCUMENTS

| 9,963,054 B2 * | 5/2018 | Tanaka | ..................... B60N 2/99 |
| 10,227,028 B1 * | 3/2019 | Wang | ..................... B60N 2/914 |

| 2008/0136237 A1 * | 6/2008 | Kayumi | ................. B60N 2/914 |
| | | | 297/284.9 |
| 2015/0203004 A1 * | 7/2015 | Sliwa | ..................... B60N 2/914 |
| | | | 297/284.1 |
| 2015/0360636 A1 * | 12/2015 | Kaneko | .................... B60N 2/68 |
| | | | 280/730.2 |
| 2018/0222362 A1 * | 8/2018 | Line | ...................... B60N 2/643 |
| 2018/0339626 A1 * | 11/2018 | Kojima | .................. B60N 2/026 |
| 2021/0170927 A1 * | 6/2021 | Nageshkar | ............... B60N 2/68 |
| 2021/0245642 A1 * | 8/2021 | Lee | ........................... B60N 2/99 |
| 2021/0276469 A1 | 9/2021 | Sakai et al. | |

(Continued)

FOREIGN PATENT DOCUMENTS

| JP | 2018-25128 A | 2/2018 |
| JP | 2018-34730 A | 3/2018 |

*Primary Examiner* — Magdalena Topolski
*Assistant Examiner* — Shanna Danielle Glover
(74) *Attorney, Agent, or Firm* — Oblon, McClelland, Maier & Neustadt, L.L.P.

(57) ABSTRACT

In a seat drive device that is built in a seat including a central portion and a side support located outside the central portion in a width direction, and drives the side support, the seat drive device includes a base fixed to the seat, a paddle that is rotatably supported with respect to the base and rotates in a unfolding direction to displace the side support toward a seating region of a user, and an air bag that is disposed between the base and the paddle and rotates the paddle in the unfolding direction by expansion accompanying air supply, wherein the paddle includes a pressing portion that presses the side support from inside, and an arm that is rotatably supported with respect to the base and extends toward the pressing portion, wherein a rotation axis of the paddle is located at the central portion of the seat, and wherein the arm is curved toward a retraction direction that is a direction opposite to the unfolding direction.

16 Claims, 5 Drawing Sheets

(56) References Cited

U.S. PATENT DOCUMENTS

2021/0323456 A1*  10/2021  Ceglarek .................. B60N 2/99
2023/0311720 A1*  10/2023  Tanabe ................. B60N 2/0276
296/65.01

* cited by examiner

SEAT DRIVE DEVICE

CROSS REFERENCE TO RELATED APPLICATIONS

This application is based on and claims priority under 35 U.S.C. § 119 to Japanese Patent Application No. 2023-28189, filed on Feb. 27, 2023 and Japanese Patent Application No. 2023-212731, filed on Dec. 18, 2023, the entire content of which is incorporated herein by reference.

TECHNICAL FIELD

The present disclosure relates to a seat drive device.

BACKGROUND DISCUSSION

JP 2018-25128 A describes a vehicle seat including a seat cushion that supports legs and buttocks of a user, and a seat back that supports an upper body of the user. Each of the side support of the seat cushion and the side support of the seat back incorporate an air bag expanding by supply of air.

When the air bag built in the side support of the seat cushion expands in a state where the user is seated on the vehicle seat, the side support rises toward the legs and the buttocks of the user. Similarly, when the air bag built in the side support of the seat back expands, the side support rises toward the upper body of the user. In this way, the vehicle seat improves the holding property of the user by bringing the side support to the user.

The vehicle seat as described above has room for improvement in terms of enhancing the holding property of the user by the side support.

A need thus exists for a seat drive device which is not susceptible to the drawback mentioned above.

SUMMARY

In a seat drive device that is built in a seat including a central portion and a side support located outside the central portion in a width direction, and drives the side support, the seat drive device includes a base fixed to the seat, a paddle that is rotatably supported with respect to the base and rotates in a unfolding direction to displace the side support toward a seating region of a user, and an air bag that is disposed between the base and the paddle and rotates the paddle in the unfolding direction by expansion accompanying air supply, wherein the paddle includes a pressing portion that presses the side support from inside, and an arm that is rotatably supported with respect to the base and extends toward the pressing portion, wherein a rotation axis of the paddle is located at the central portion of the seat, and wherein the arm is curved toward a retraction direction that is a direction opposite to the unfolding direction.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, a seat including a seat drive device will be described with reference to the drawings. In some drawings, hatching indicating a cross section is omitted for easy understanding of description.

Configuration of Present Embodiment

Figure 1:
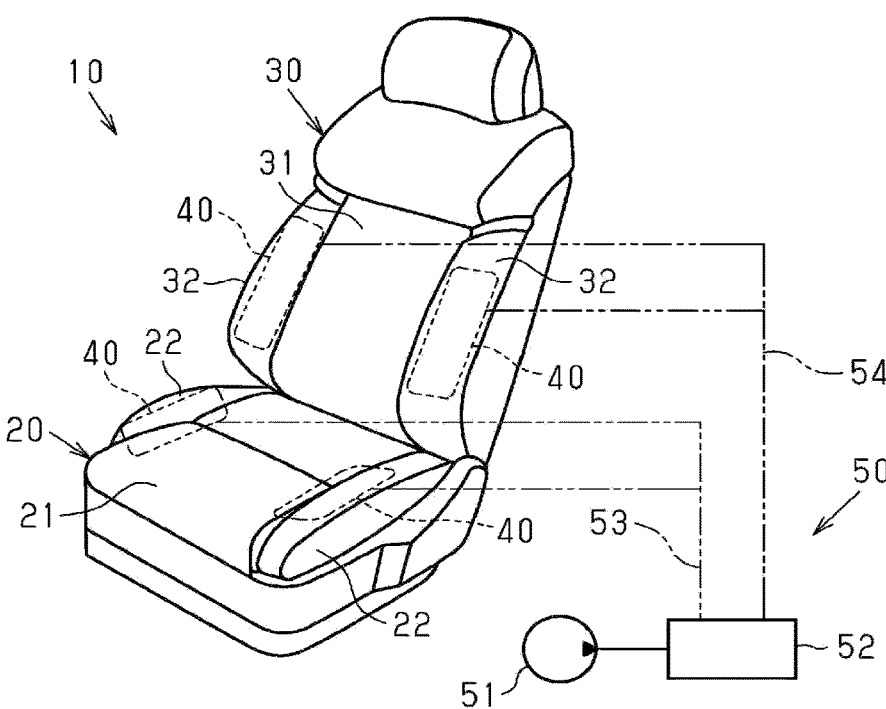
FIG. 1 is a perspective view of a seat including a seat drive device.

As illustrated in FIG. 1, a seat 10 includes a seat cushion 20, a seat back 30, four seat drive devices 40, and an air supply/exhaust system 50. The seat 10 corresponds to, for example, a driver seat, a passenger seat, a rear seat, and the like of the vehicle.

<Seat Cushion 20 and Seat Back 30>

As illustrated in FIG. 1, the seat cushion 20 includes a seat portion 21 and two side supports 22. The seat cushion 20 supports the buttocks and thighs of the user. The seat portion 21 is located at a central portion of the seat cushion 20 in the width direction. The two side supports 22 are located at both end portions of the seat cushion 20 in the width direction. In this respect, the seat portion 21 corresponds to a "central portion". The side support 22 is located outside of the "central portion" in the width direction.

The seat back 30 includes a backrest 31 and two side supports 32. The seat back 30 supports the back of the user. The backrest 31 is located at a central portion of the seat back 30 in the width direction. The two side supports 32 are located at both end portions of the seat back 30 in the width direction. In this respect, the backrest 31 corresponds to a "central portion". The side support 32 is located outside of the "central portion" in the width direction.

Although not illustrated, the seat cushion 20 includes a seat frame constituting a skeleton, a cushion spring supported by the seat frame, a cushion pad attached to the cushion spring, and a skin covering the cushion pad. The same applies to the seat back 30.

<Seat Drive Device 40>

As illustrated in FIG. 1, the two seat drive devices 40 are built in the seat cushion 20. Specifically, the two seat drive devices 40 are disposed at positions corresponding to the two side supports 22 of the seat cushion 20. Similarly, the two seat drive devices 40 are built in the seat back 30. Specifically, the two seat drive devices 40 are disposed at positions corresponding to the two side supports 32 of the seat back 30. The seat drive device 40 for the seat cushion 20 and the seat drive device 40 for the seat back 30 have the same basic structure.

Figure 2:
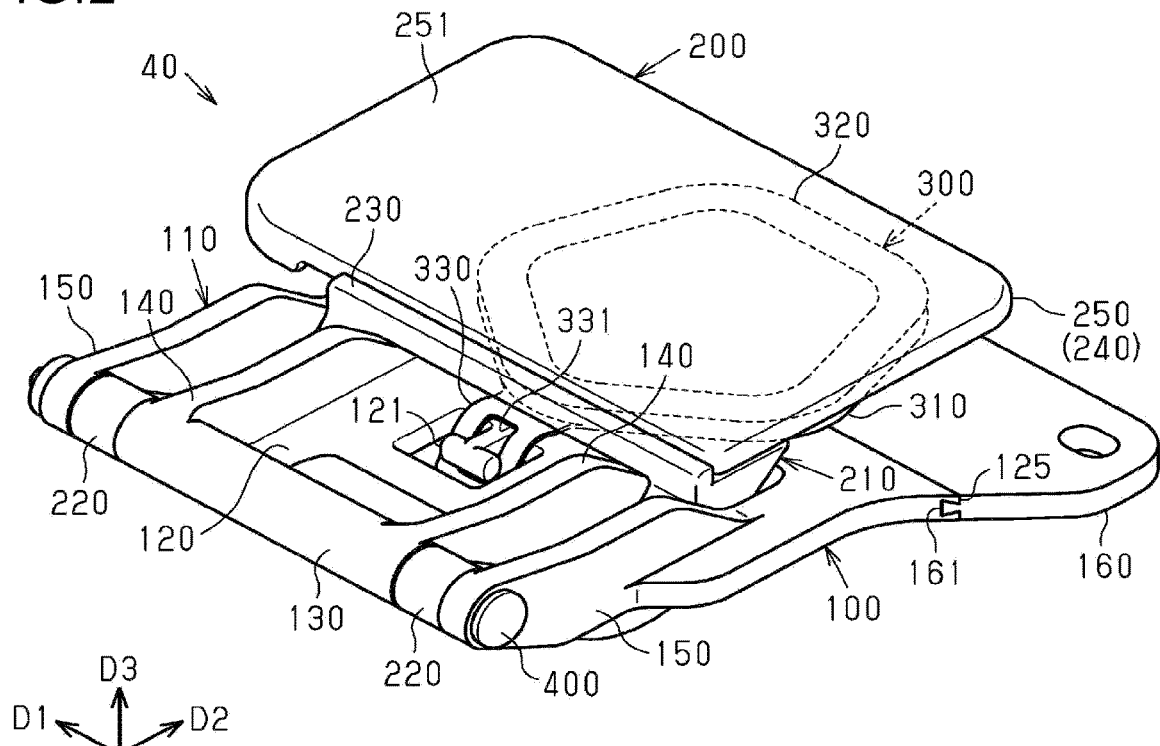
FIG. 2 is a perspective view of the seat drive device.

As illustrated in FIG. 2, a seat drive device 40 includes a base 100, a paddle 200, an air bag 300, and a connection shaft 400. In the following description, the seat drive device 40 will be described in accordance with a first direction D1, a second direction D2, and a third direction D3. The first direction D1, the second direction D2, and the third direction D3 are directions orthogonal to each other.

<Base 100>

Figure 3:
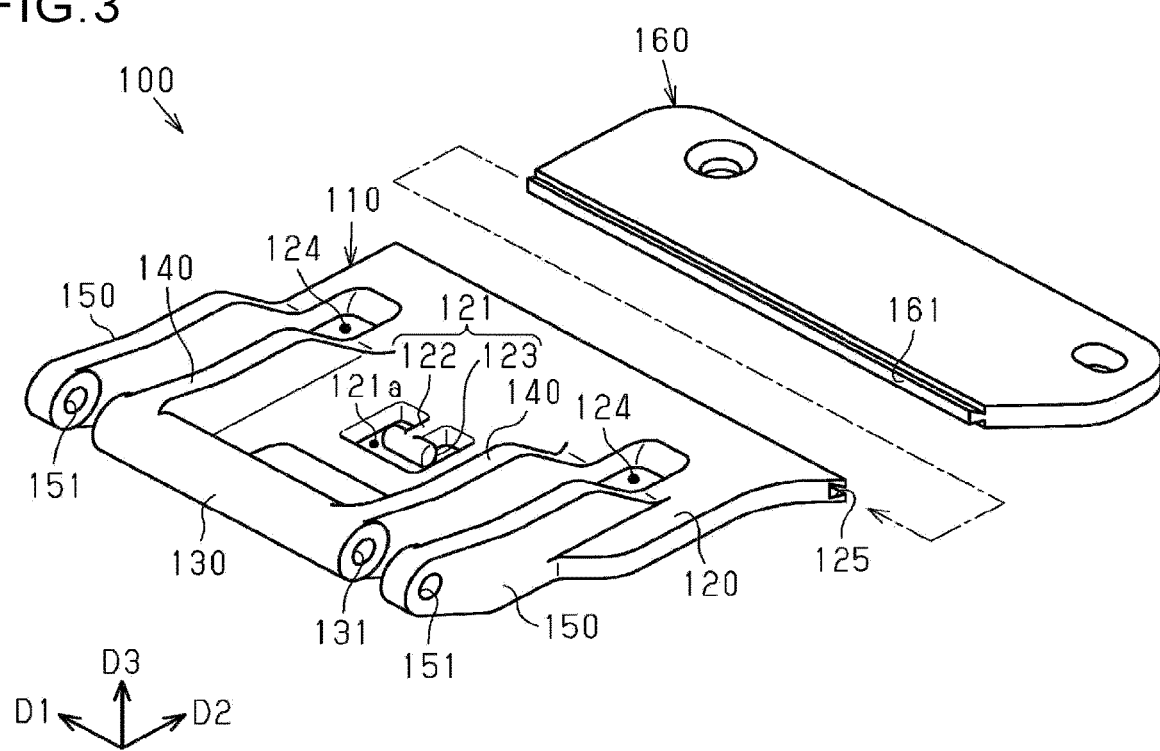
FIG. 3 is an exploded perspective view of a base of the seat drive device.

As illustrated in FIG. 3, the base 100 includes a main base 110 and a sub base 160.

The main base 110 includes a bottom wall 120, a bearing portion 130, two inner guide walls 140, and two outer guide walls 150. The main base 110 is made of, for example, a resin material.

The bottom wall 120 has a flat plate shape with the third direction D3 as a plate thickness direction. The bottom wall 120 is a portion fixed to the seat frame of the seat 10 when the seat drive device 40 is incorporated in the seat 10. In this respect, the shape of the bottom wall 120 may be any shape corresponding to the seat frame.

The bottom wall 120 has a locking portion 121. The bottom wall 120 has a through hole 121a penetrating the bottom wall 120 in the plate thickness direction. In plan view in the third direction D3, the locking portion 121 and the through hole 121a are located at the center of the bottom wall 120. The locking portion 121 includes a first shaft portion 122 extending in the second direction D2 from a side face facing the through hole 121a, and a second shaft portion 123 extending in the first direction D1. The second shaft portion 123 extends from the distal end portion of the first shaft portion 122 in both directions in the first direction D1. Therefore, the locking portion 121 has a T shape in plan view. The locking portion 121 is a portion for locking the air bag 300 to the bottom wall 120. Therefore, the locking portion 121 may have another shape as long as it can lock the air bag 300.

The bottom wall 120 has two slits 124 and a first recess 125. The two slits 124 are spaced apart in the first direction D1. The two slits 124 extend from the first end toward the second end of the bottom wall 120 in the second direction D2. The width of the slit 124 is constant with respect to the longitudinal direction of the slit 124. The first recess 125 is a groove recessed from an end face of the bottom wall 120 on the second end side in the second direction D2. The first recess 125 is provided over the first direction D1. A cross-sectional shape of the first recess 125 orthogonal to the first direction D1 is a trapezoidal shape. The width of the first recess 125 in the third direction D3 increases in the depth direction of the first recess 125, that is, toward the bottom face of the first recess 125.

The bearing portion 130 has a columnar shape. The bearing portion 130 is located between the two slits 124 in the first direction D1, the slits being at a first end of the bottom wall 120 in the second direction D2. The axial direction of the bearing portion 130 coincides with the first direction D1. The bearing portion 130 has a shaft hole 131 penetrating in the first direction D1.

The inner guide wall 140 and the outer guide wall 150 have a plate shape with the first direction D1 as a plate thickness direction. The widths of the inner guide wall 140 and the outer guide wall 150 in the third direction D3 are longer than the plate thickness of the bottom wall 120 in the third direction D3. The two inner guide walls 140 are respectively located inside the two slits 124 in the first direction D1, and the two outer guide walls 150 are respectively located outside the two slits 124 in the first direction D1. That is, the two inner guide walls 140 and the two outer guide walls 150 extend along the slit 124. The two inner guide walls 140 are integrated with the bearing portion 130. The two outer guide walls 150 have shaft holes 151 penetrating in the first direction D1. The axis of the shaft hole 151 of the two outer guide walls 150 coincides with the axis of the shaft hole 131 of the bearing portion 130. Each of the two inner guide walls 140 and the two outer guide walls 150 correspond to a "guide wall".

The sub base 160 is made of, for example, a resin material. The sub base 160 has a plate shape with the third direction D3 as a plate thickness direction. The sub base 160 has a shape corresponding to the bottom wall 120 of the main base 110. As in the bottom wall 120, the sub base 160 is a portion fixed to the seat frame of the seat 10 when the seat drive device 40 is incorporated in the seat 10. In this respect, the shape of the sub base 160 may be any shape corresponding to the seat frame.

The sub base 160 has a first protrusion 161. The first protrusion 161 protrudes from an end face of the sub base 160 on the first end side in the second direction D2. The first protrusion 161 has a trapezoidal cross-sectional shape orthogonal to the first direction D1. The width of the first protrusion 161 in the third direction D3 increases toward the protruding direction of the first projection 161. As indicated by an alternate long and short dash line arrow in FIG. 3, by inserting the first protrusion 161 of the sub base 160 into the first recess 125 of the main base 110 from the first direction D1, the sub base 160 is integrated with the main base 110.

<Paddle 200>

Figure 4:
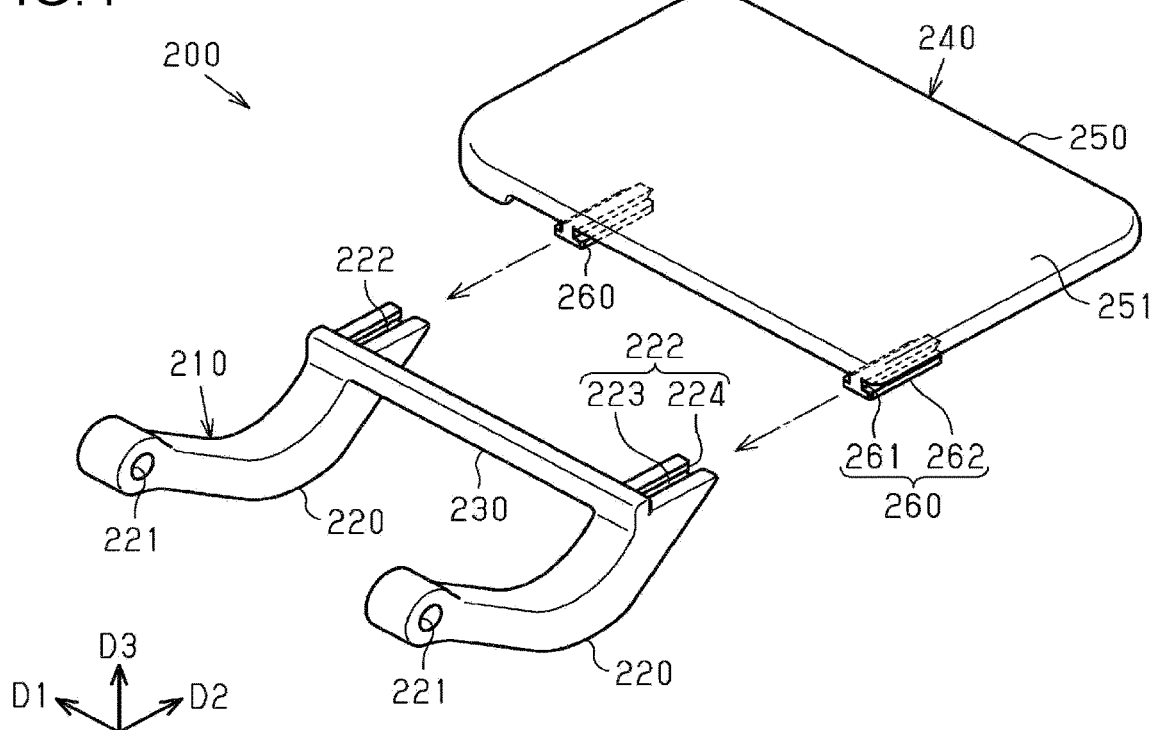
FIG. 4 is an exploded perspective view of a paddle of the seat drive device.

As illustrated in FIG. 4, the paddle 200 includes an arm unit 210 and a pressing portion 240.

The arm unit 210 includes two arms 220 and a connection portion 230. The arm unit 210 is made of, for example, a resin material.

The arm 220 has a curved rod shape. In a side view in the first direction D1, the arm 220 has an L shape. In the present embodiment, the curved arm 220 changes gently in the longitudinal direction, but in other embodiments, the curved arm 220 may change sharply in the longitudinal direction. That is, the intermediate portion of the arm 220 is positioned to be shifted with respect to a line segment connecting the proximal end portion and the distal end portion of the arm 220. The width of the arm 220 in the first direction D1 is slightly smaller than the width of the slit 124 in the first direction D1. The arm 220 includes a shaft hole 221 and a second recess 222. The shaft hole 221 penetrates the proximal end portion of the arm 220 in the first direction D1. The second recess 222 is provided at the distal end portion of the arm 220. The second recess 222 extends linearly in a direction orthogonal to the first direction D1. When viewed in the second direction D2, the second recess 222 includes a lateral groove 223 extending in the first direction D1 and a longitudinal groove 224 extending from the center of the lateral groove 223 in a direction orthogonal to the lateral groove 223. That is, the cross-sectional shape of the second recess 222 is a T-shape. The connection portion 230 has a rod shape extending in the first direction D1. The connection portion 230 connects the distal end portions of the two arms 220 to each other.

The pressing portion 240 includes a pressing panel 250 and two second protrusions 260. The pressing portion 240 is made of, for example, a resin material.

The pressing panel 250 has a rectangular plate shape. That is, the pressing panel 250 has the pressing face 251 having a planar shape. The pressing panel 250 is a portion that presses the side supports 22 and 32 from the inside of the side supports 22 and 32. Therefore, the size of the pressing panel 250 is preferably a size corresponding to the side supports 22 and 32. Further, the pressing face 251 may be a curved face.

The two second protrusions 260 are positioned with a space therebetween in the first direction D1. The second protrusion 260 is provided over the second direction D2. The second protrusion 260 protrudes from the lower face of the pressing panel 250. Specifically, the second protrusion 260 includes a vertical wall 261 extending from the lower face of the pressing panel 250 in the plate thickness direction of the pressing panel 250, and a lateral wall 262 extending from the distal end of the vertical wall 261 in both directions in the first direction D1. That is, the cross-sectional shape of the first protrusion 161 is a T-shape corresponding to the cross-sectional shape of the second recess 222. In the first direction D1, the formation interval between the two second protrusions 260 is equal to the formation interval between the two second recesses 222 in the arm unit 210. In the second direction D2, the length of the second protrusion 260 is substantially the same as the length of the second recess 222. As indicated by an alternate long and short dash line arrow in FIG. 4, the pressing portion 240 is integrated with the arm unit 210 by inserting the two second protrusions 260 of the pressing portion 240 into the two second recesses 222 of the arm unit 210. That is, the pressing portion 240 is fixed to the distal end portions of the two arms 220. In this respect, it can be said that the two arms 220 extend toward the pressing portion 240 in a state of being spaced apart in the first direction D1.

As illustrated in FIG. 2, the paddle 200 is rotatably supported by the base 100. Specifically, the arm 220 of the paddle 200 is disposed between the inner guide wall 140 and the outer guide wall 150 on one side of the base 100 in the first direction D1. The arm 220 of the paddle 200 is disposed between the inner guide wall 140 and the outer guide wall 150 on the other side of the base 100 in the first direction D1. Further, the connection shaft 400 whose axial direction is the first direction D1 is inserted into the shaft hole 131 of the bearing portion 130 of the base 100, the shaft holes 151 of the two outer guide walls 150 of the base 100, and the shaft holes 221 of the two arms 220 of the paddle 200. Thus, the proximal end portions of the two arms 220 are rotatably supported by the base 100. As a result, the paddle 200 is rotatable about the axis of the connection shaft 400 with respect to the base 100.

Hereinafter, a rotation direction when the paddle 200 moves away from the base 100 is referred to as a unfolding direction R1, and a rotation direction when the paddle 200 approaches the base 100 is referred to as a retraction direction R2. The unfolding direction R1 is a direction opposite to the retraction direction R2. In a state where the paddle 200 is supported by the base 100, in a side view in the first direction D1, the intermediate portions of the two arms 220 are curved toward the retraction direction R2 with respect to the proximal end portion and the distal end portion. In other words, the portion close to the rotation center of the paddle 200 is recessed toward the retraction direction R2 relative to the portion far from the rotation center of the paddle 200.

In addition, under a situation where the base 100 is fixed to the seat 10, the rotation axis of the paddle 200 is located closer to the center of the seat 10 in the width direction than the pressing portion 240. As a result, the rotation axis of the paddle 200 is located at the seat portion 21 or the backrest 31. That is, the rotation axis of the paddle 200 passes through the inside of the seat portion 21 or the inside of the backrest 31.

<Air Bag 300>

Figure 5:
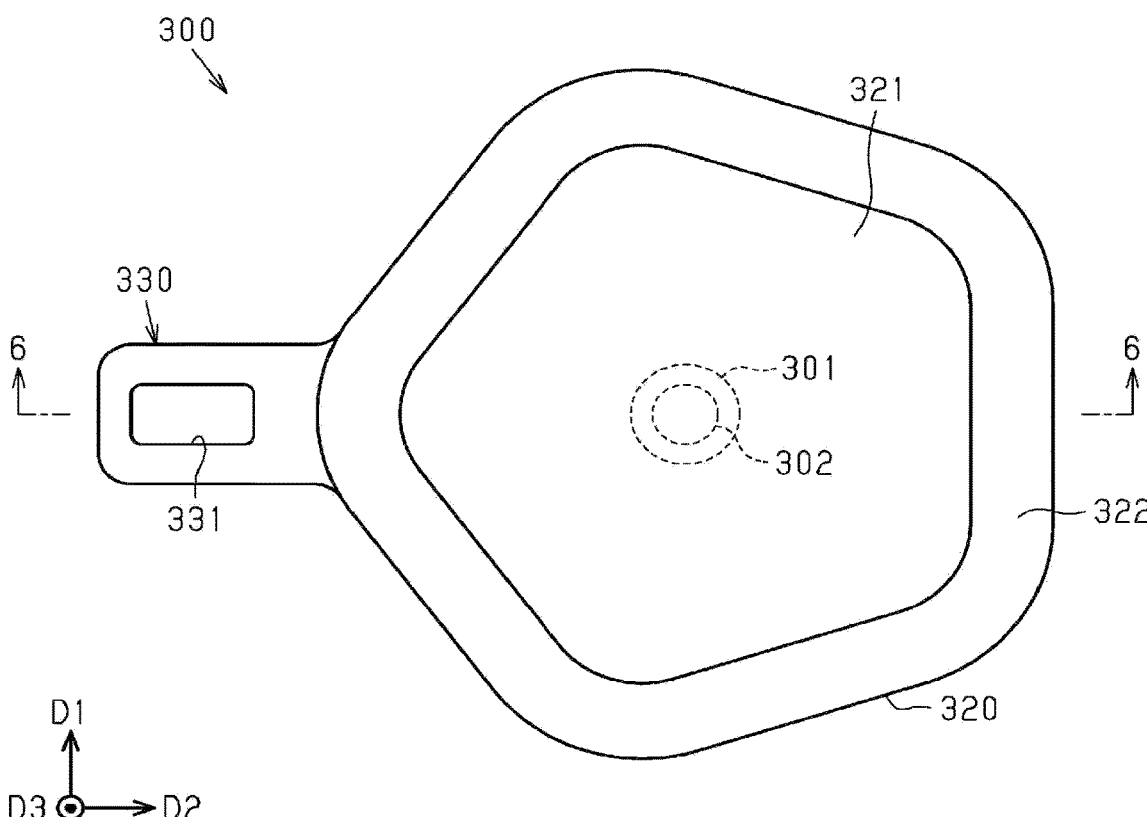
FIG. 5 is a plan view of an air bag of the seat drive device.
Figure 6:
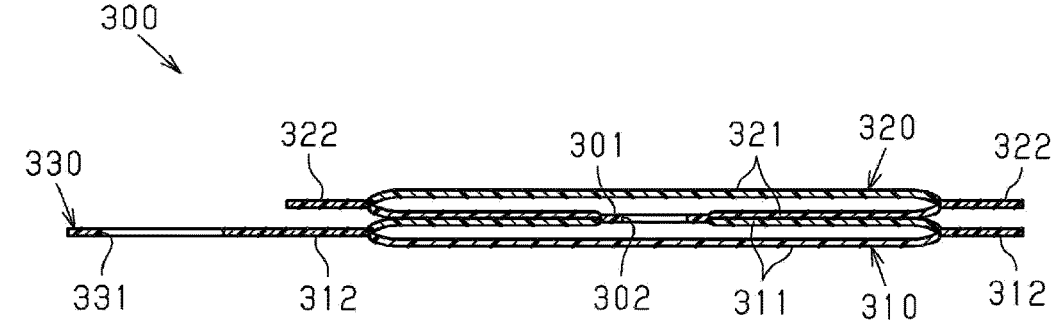
FIG. 6 is a cross-sectional view of the air bag of the seat drive device taken along line VI-VI.
Figure 6:
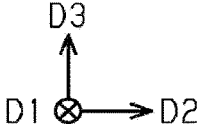

As illustrated in FIGS. 5 and 6, the air bag 300 includes a first bag body 310, a second bag body 320, and an extension portion 330.

The first bag body 310 is formed in a bag shape by welding outer edges of two first films 311 having a polygonal shape in plan view. The outer edges of the two first films 311 are welded to form a first welded portion 312. Similarly, the second bag body 320 is formed in a bag shape by welding outer edges of two second films 321 having a polygonal shape in plan view. The outer edges of the two second films 321 are welded to form a second welded portion 322. Then, the first bag body 310 and the second bag body 320 expand with supply of air and contract with discharge of air.

The first bag body 310 and the second bag body 320 are stacked. In other words, the two first films 311 and the two second films 321 are stacked. Among the two first films 311 and the two second films 321, the central portion of the first film 311 and the central portion of the second film 321 located in the middle are welded to form a joint portion 301. The joint portion 301 includes a communication passage 302 that allows the inside of the first bag body 310 and the inside of the second bag body 320 to communicate with each other. Therefore, when the first bag body 310 expands due to supply of air, the second bag body 320 also expands, and when the first bag body 310 contracts due to exhaust of air, the second bag body 320 also contracts. Although not illustrated, the first bag body 310 is provided with a connector for connecting tubes 53 and 54 to be described later.

The extension portion 330 extends from the first bag body 310. The extension portion 330 has a film shape having appropriate elasticity. The extension portion 330 has a rectangular shape in plan view in the thickness direction. The extension portion 330 has a locking hole 331 penetrating in the thickness direction. The locking hole 331 has a rectangular shape smaller by one size than the extension portion 330 in plan view in the thickness direction. The length of the locking hole 331 in the short direction is longer than the length of the first shaft portion 122 of the locking portion 121 in the first direction D1, and is shorter than the length of the second shaft portion 123 of the locking portion 121 in the first direction D1. The length of the locking hole 331 in the longitudinal direction is longer than the length of the first shaft portion 122 of the locking portion 121 in the third direction D3.

In the present embodiment, the extension portion 330 is part of the first welded portion 312 formed by welding the two first films 311 constituting the first bag body 310. Therefore, the first bag body 310 and the extension portion 330 are simultaneously formed at the time of welding the two first films 311. In another embodiment, the extension portion 330 can be configured separately from the first bag body 310. In this case, the extension portion 330 may extend from any part of the two first films 311.

As illustrated in FIG. 2, the air bag 300 is disposed between the base 100 and the pressing portion 240 of the paddle 200. At this time, the extension portion 330 of the air bag 300 extends toward the rotation axis of the paddle 200 and is locked to the base 100 between the rotation regions of the two arms 220. Specifically, the distal end of the extension portion 330 of the air bag 300 penetrates the base 100 through the through hole 121a of the base 100, and the locking portion 121 of the base 100 is inserted into the locking hole 331 of the extension portion 330 of the air bag 300. Note that the rotation region of the arm 220 means a region through which the arm 220 passes when the paddle 200 rotates.

In the first direction D1, the length of the locking hole 331 is less than the length of the second shaft portion 123 of the locking portion 121. Therefore, the extension portion 330 of the air bag 300 is less likely to fall off the locking portion 121 of the base 100. The length of the locking hole 331 in the longitudinal direction is longer than the length of the first shaft portion 122 of the locking portion 121 in the third direction D3. Therefore, the extension portion 330 of the air bag 300 is movable in a direction intersecting the first direction D1 with respect to the locking portion 121.

<Air Supply/Exhaust System 50>

As illustrated in FIG. 1, the air supply/exhaust system 50 includes a pump 51, a valve device 52, and a plurality of tubes 53 and 54.

The pump 51 may be an electric pump including an electric motor as a drive source. The pump 51 drives an electric motor based on electric power supplied from an in-vehicle battery. The pump 51 is connected to the valve device 52 via a supply tube. Then, the pump 51 supplies air toward the valve device 52.

The valve device 52 includes a plurality of solenoid valves. The valve device 52 is connected to two air bags 300 disposed inside the side support 22 of the seat cushion 20 via the first tube 53. Similarly, the valve device 52 is connected to the two air bags 300 disposed inside the side supports 32 of the seat back 30 via the second tube 54. Then, the valve device 52 individually switches between the air supply mode for the two air bags 300 disposed inside the side support 22 of the seat cushion 20 and the air supply mode for the two air bags 300 disposed inside the side support 32 of the seat back 30.

Operation of Present Embodiment

An operation when the seat drive device 40 drives the side support 22 of the seat cushion 20 will be described. The operation when the seat drive device 40 drives the side support 32 of the seat back 30 is equivalent to the operation when the seat drive device 40 drives the side support 22 of the seat cushion 20, and thus is omitted.

Figure 7:
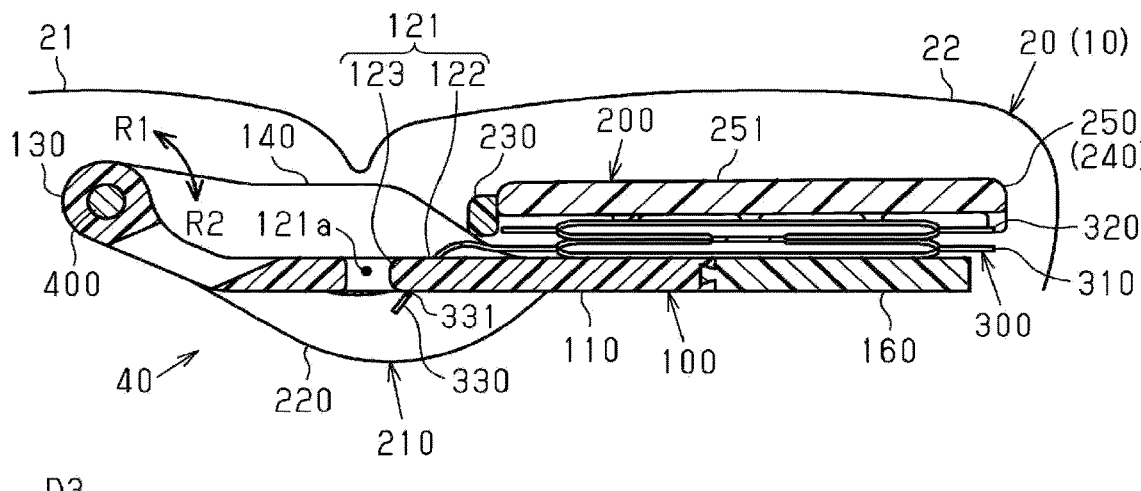
FIG. 7 is a cross-sectional view for describing the operation of the seat drive device.
Figure 7:
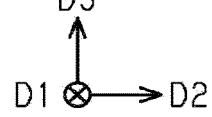

FIG. 7 illustrates the seat drive device 40 when the air bag 300 is most contracted. In the case illustrated in FIG. 7, since the air bag 300 does not push the paddle 200 in the unfolding direction R1, the paddle 200 is most rotated in the retraction direction R2. Therefore, the side support 22 does not rise. In other words, the side support 22 is not displaced toward the seating region of the user.

Under a situation where the paddle 200 is most rotated in the retraction direction R2, when viewed in the first direction D1, the curved portion of the arm 220 of the paddle 200 penetrates the base 100 in the retraction direction R2. Specifically, the curved portion of the arm 220 penetrates the base 100 in the retraction direction R2 via the slit 124 of the base 100. At this time, at least part of the arm 220 may penetrate the base 100 in the retraction direction R2.

The distal end of the extension portion 330 of the air bag 300 penetrates the base 100 in the retraction direction R2. Specifically, the distal end of the extension portion 330 of the air bag 300 penetrates the base 100 in the retraction direction R2 through the through hole 121a of the base 100. However, the distal end of the extension portion 330 of the air bag 300 protrudes only slightly with respect to the base 100 as compared with the arm 220 of the paddle 200. Therefore, when the seat drive device 40 is viewed in the first direction D1, the distal end of the extension portion 330 of the air bag 300 is hidden by the arm 220 of the paddle 200.

Figure 8:
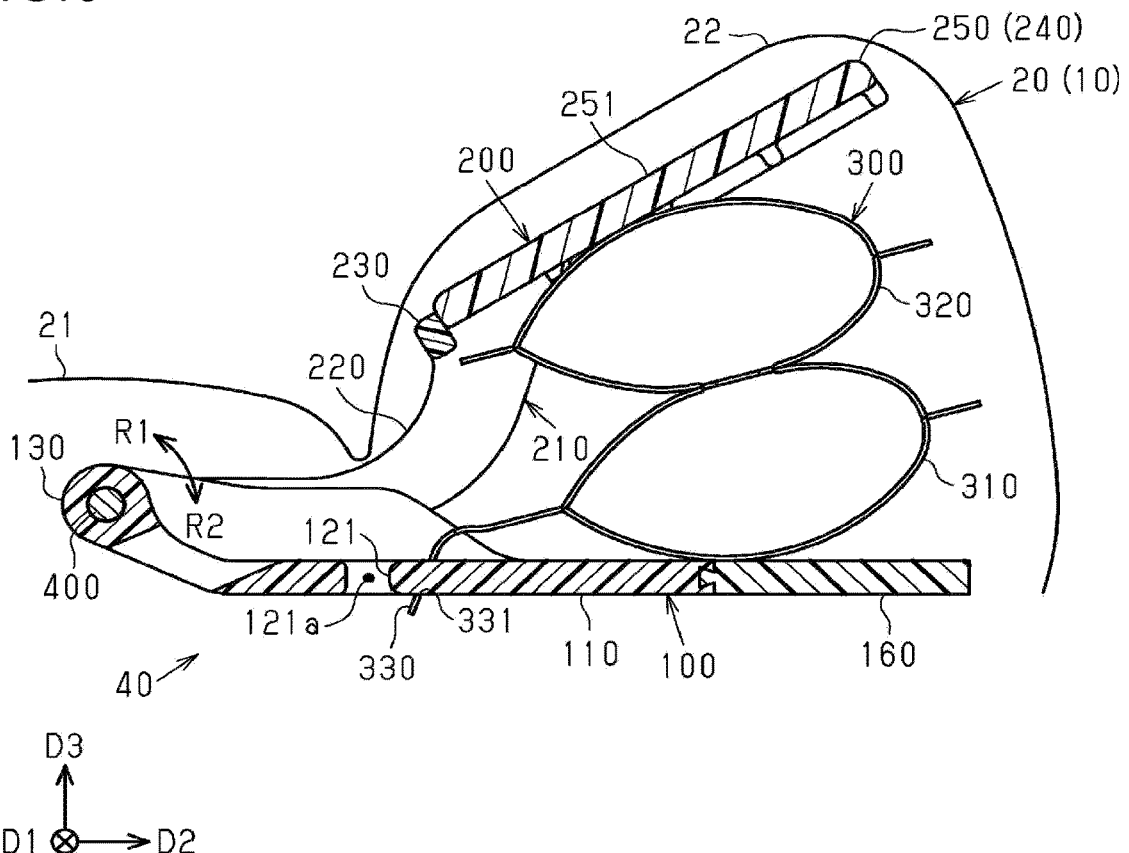
FIG. 8 is a cross-sectional view for describing the operation of the seat drive device.

As illustrated in FIG. 8, when the seat drive device 40 is driven by the user, the air bag 300 starts to expand between the base 100 and the pressing portion 240. Then, when the air bag 300 pushes the paddle 200, the paddle 200 rotates in the unfolding direction R1. Subsequently, when the pressing portion 240 of the paddle 200 presses the side support 22 from the inside, the side support 22 rises. In other words, the side support 22 is displaced toward the seating region of the user. In this way, the user's body is held by the side support 22.

Effects of Present Embodiment (1) A comparative example in which the arm 220 of the paddle 200 is not curved is considered. In this comparative example, when the paddle 200 is rotated in the unfolding direction R1, both the seat portion 21 and the side support 22 of the seat cushion 20 are pushed, so that it is not possible to largely displace the side support 22 alone. Therefore, in the comparative example, the seat portion 21 of the seat cushion 20 may push the user's body upward, or the amount of rising of the side support 22 may be insufficient.

On the other hand, in the seat drive device 40 of the present embodiment, the arm 220 of the paddle 200 is curved in the retraction direction R2. Thus, the seat drive device 40 can selectively push only the side support 22 so as not to push the seat portion 21 of the seat cushion 20 when rotating the paddle 200 in the unfolding direction R1. As a result, the seat drive device 40 can suppress pushing of the user's body by the seat portion 21 of the seat cushion 20 when the side support 22 is driven. Further, the seat drive device 40 can increase the holding property of the user in that the amount of rising of the side support 22 can be increased. The same applies to the seat drive device 40 that drives the side support 32 of the seat back 30.

(2) The arm 220 is curved such that an intermediate portion in the longitudinal direction of the arm 220 is located in the retraction direction R2 relative to both end portions. For this reason, when the paddle 200 rotates in the unfolding direction R1, the arm 220 tends to be difficult to push the seat portion 21 and the backrest 31. Thus, the seat drive device 40 can more selectively displace only the side supports 22 and 32 when rotating the paddle 200 in the unfolding direction R1.

(3) In the seat drive device 40, the air bag 300 is locked to the base 100 via the extension portion 330. Thus, the seat drive device 40 can suppress detachment of the air bag 300 from the base 100 when the air bag 300 expands or contracts. In addition, in the comparative example in which the first bag body 310 is directly locked to the base 100, expansion and contraction of the air bag 300 may be hindered due to the locking structure of the air bag 300 with respect to the base 100. In this regard, in the seat drive device 40 of the present embodiment, the air bag 300 is locked to the base 100 via the extension portion 330 extending toward the rotation axis of the paddle 200. Therefore, the seat drive device 40 can reduce the possibility that the expansion and contraction of the air bag 300 is hindered due to the locking structure of the air bag 300 with respect to the base 100.

(4) Due to the relationship between the size of the locking hole 331 of the extension portion 330 of the air bag 300 and the size of the locking portion 121 of the base 100, the air bag 300 can move with respect to the base 100. For this reason, the seat drive device 40 can further suppress the air bag 300 being prevented from expanding and contracting due to the locking structure of the air bag 300 with respect to the base 100.

(5) The air bag 300 of the seat drive device 40 includes the first bag body 310 and the second bag body 320 that are stacked. Therefore, the seat drive device 40 can displace the side supports 22 and 32 more largely by the expansion of the first bag body 310 and the second bag body 320. The extension portion 330 extends from the first bag body 310 close to the base 100. Therefore, the seat drive device 40 can shorten the length of the extension portion 330 as compared with the case where the extension portion 330 extends from the second bag body 320 far from the base 100.

(6) When the shapes of the side supports 22 and 32 of the seat 10 are different, the shape of the paddle 200 suitable for the side supports 22 and 32 is also different. In this respect, in the paddle 200 of the seat drive device 40, the pressing portion 240 and the arm unit 210 are configured separately. Therefore, the seat drive device 40 can select the optimum pressing portion 240 from the plurality of pressing portions 240 having different shapes, or select the optimum arm unit 210 from the plurality of arm units 210 having different shapes.

(7) The arm 220 of the paddle 200 is sandwiched between the inner guide wall 140 and the outer guide wall 150 of the base 100. Thus, the seat drive device 40 can suppress movement of the arm 220 in a direction different from the rotation direction when the paddle 200 rotates.

(8) Under the situation where the paddle 200 rotates most in the retraction direction R2, the curved portion of the arm 220 penetrates the base 100 in the retraction direction R2. Therefore, even when the paddle 200 rotates in the unfolding direction R1, the arm 220 is more easily disposed in the retraction direction R2 than the pressing portion 240. Therefore, in the seat drive device 40, when the paddle 200 is rotated in the unfolding direction R1, the side supports 22 and 32 can be largely displaced by the pressing portion 240, and large displacement of the seat portion 21 and the backrest 31 by the arm 220 can be suppressed.

(9) The seat drive device 40 includes two arms 220. Thus, the seat drive device 40 can stabilize the rotation of the paddle 200. The extension portion 330 of the air bag 300 is locked to the base 100 between the rotation regions of the two arms 220. Thus, the seat drive device 40 can suppress the extension portion 330 of the air bag 300 hindering the rotation of the paddle 200.

(10) Since the extension portion 330 of the air bag 300 is locked to the base 100 in a state of penetrating the base 100 in the retraction direction R2, the air bag 300 is likely to be hardly detached from the base 100 even when the air bag 300 repeats expansion and contraction. In addition, under the situation where the paddle 200 rotates most in the retraction direction R2, the distal end of the extension portion 330 is hidden by a portion of the two arms 220, the portion penetrating the base 100 in the retraction direction R2. For this reason, when the components inside the seat 10 are disposed to avoid interference with the two arms 220, the components are less likely to come into contact with the distal end of the extension portion 330. As a result, the seat drive device 40 can suppress detachment of the extension portion 330 from the base 100 due to contact with the internal components of the seat 10.

MODIFICATIONS

The present embodiment can be modified as follows. The present embodiment and the following modification examples can be implemented in combination with each other within a range not technically contradictory.

Figures 9, 10, 11:
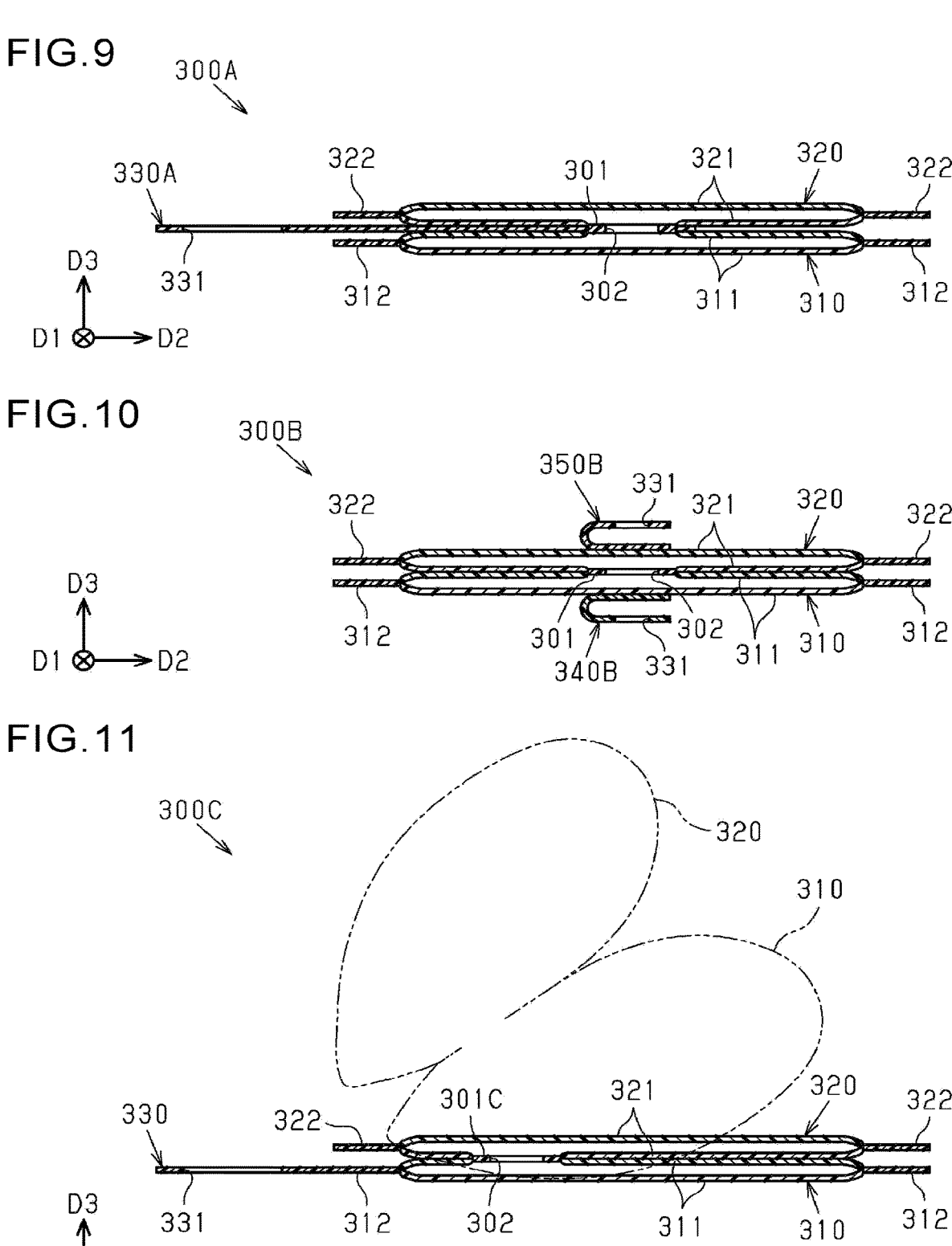
FIG. 9 is a cross-sectional view of an air bag of the first modification.
FIG. 10 is a cross-sectional view of an air bag of the second modification.
FIG. 11 is a cross-sectional view of an air bag of the third modification.

As illustrated in FIG. 9, an air bag 300A according to the first modification includes the first bag body 310, the second bag body 320, and an extension portion 330A. The extension portion 330A is positioned between the first bag body 310 and the second bag body 320. The extension portion 330A is joined to at least one of the first film 311 and the second film 321 constituting the joint portion 301. The extension portion 330A extends in a direction orthogonal to the stacking direction of the first bag body 310 and the second bag body 320 so as to protrude from the first bag body 310 and the second bag body 320. In plan view in the stacking direction of the air bag 300A, the extension portion 330A has a rectangular shape. The distal end portion of the extension portion 330A has the locking hole 331. When the material of the extension portion 330A is a resin material, the extension portion 330A can be welded to the joint portion 301 when the first film 311 and the second film 321 are welded to form the joint portion 301. The air bag 300A according to the first modification can be locked to the base 100 via the extension portion 330A, as in the air bag 300 of the above embodiment.

As illustrated in FIG. 10, an air bag 300B according to the second modification includes the first bag body 310 and the second bag body 320, and a first extension portion 340B and a second extension portion 350B.

The first extension portion 340B is joined to a central portion, of the first film 311, that is not welded to the second film 321 among the two first films 311. The shape of the first extension portion 340B is any shape as long as it can be locked to the base 100. For example, when the base 100 has a configuration corresponding to the locking portion 121 of the above embodiment, the first extension portion 340B preferably has a configuration corresponding to the locking hole 331 of the above embodiment. When the material of the first extension portion 340B is a resin material, the first extension portion 340B can be joined to the first film 311 by welding.

Similarly, the second extension portion 350B is joined to a central portion, of the second film 321, that is not welded to the first film 311 among the two second films 321. The shape of the second extension portion 350B is any shape as long as it can be locked to the pressing portion 240 of the paddle 200. For example, when the pressing portion 240 of the paddle 200 has a configuration corresponding to the locking portion 121 of the above embodiment, the second extension portion 350B preferably has a configuration corresponding to the locking hole 331 of the above embodiment. When the material of the second extension portion 350B is a resin material, the second extension portion 350B can be joined to the second film 321 by welding.

The air bag 300B according to the second modification can be locked to the base 100 and the paddle 200 by the first extension portion 340B and the second extension portion 350B. The materials of the first extension portion 340B and the second extension portion 350B may be a material having elasticity that can be elastically deformed or a hard material that cannot be elastically deformed when the air bag 300B is attached.

As illustrated in FIG. 11, an air bag 300C according to the third modification includes the first bag body 310, the second bag body 320, and the extension portion 330. A joint portion 301C between the first film 311 and the second film 321 is positioned to be shifted from the central portion of the first film 311 and the second film 321. In a case where air is supplied to the air bag 300C according to the third modification, as indicated by a two-dot chain line in FIG. 11, the air bag expands so that the stacking direction of the first bag body 310 and the second bag body 320 is inclined. In this case, when the seat drive device 40 is viewed in the first direction D1, the air bag 300C may be disposed such that the joint portion 301C is located closer to the rotation center of the paddle 200 than the center of the air bag 300C. Accordingly, the air bag 300C can efficiently push the paddle 200 in the unfolding direction R1 at the time of expansion.

The inner guide wall 140 and the outer guide wall 150 can be omitted from the main base 110. In this case, the base 100 preferably supports the two arms 220 more firmly.

In the base 100, the main base 110 and the sub base 160 may be integrally configured so as not to be separable. The same applies to the relationship between the arm unit 210 and the pressing portion 240 of the paddle 200. In a case where the paddle 200 is integrally configured, a portion, of the paddle 200, pressing the side support 22 from the inside corresponds to a "pressing portion", and a portion rotatably supported by the base 100 and extending toward the "pressing portion" corresponds to an "arm".

When viewed in the first direction D1, at least part of the two arms 220 may be curved toward the retraction direction R2. For example, a portion, of the arm 220, closer to the proximal end portion than to the intermediate portion in the longitudinal direction may be curved toward the retraction direction, or a portion, of the arm 220, closer to the distal end portion than to the intermediate portion in the longitudinal direction may be curved toward the retraction direction.

Under the situation where the paddle 200 rotates most in the retraction direction R2, the curved portion of the arm 220 may not penetrate the base 100 in the retraction direction R2. Similarly, the extension portion 330 of the air bag 300 may be locked to the base 100 so as not to penetrate the base 100 in the retraction direction R2.

The number of arms 220 of the paddle 200 may be one or three or more.

In the base 100, a connection mode of the main base 110 and the sub base 160 can be appropriately changed. For example, the main base 110 and the sub base 160 may be integrated by a fastening member such as a bolt, or may be integrated by snap-fit. The same applies to the relationship between the arm unit 210 and the pressing portion 240 of the paddle 200.

The method of fixing the air bag 300 to the base 100 can be changed as appropriate. For example, the seat drive device 40 may include a fastening member such as a screw that fastens the extension portion 330 of the air bag 300 to the base 100. The seat drive device 40 may include a binding band that holds the air bag 300 to the base 100. The seat drive device 40 may include a surface fastener for joining the air bag 300 and the base 100. In the seat drive device 40, the extension portion 330 of the air bag 300 may be bonded to the base 100. Further, when the air bag 300 is bonded to the base 100, the first bag body 310 may be bonded to the base 100. In this case, the extension portion 330 can be omitted from the air bag 300.

The seat drive device 40 is not limited to an application to the vehicle seat 10, and may be applied to the seat 10 requiring a high holding property.

The air bag 300 may have one bag body or three or more bag bodies. When the air bag 300 has a plurality of bag bodies, the plurality of bag bodies may be stacked on the base 100, or may be disposed so as to be aligned in the first direction D1 and the second direction D2 on the base 100.

Summary of Present Embodiment

In a seat drive device that is built in a seat including a central portion and a side support located outside the central portion in a width direction, and drives the side support, the seat drive device includes a base fixed to the seat, a paddle that is rotatably supported with respect to the base and rotates in a unfolding direction to displace the side support toward a seating region of a user, and an air bag that is disposed between the base and the paddle and rotates the paddle in the unfolding direction by expansion accompanying air supply, wherein the paddle includes a pressing portion that presses the side support from inside, and an arm that is rotatably supported with respect to the base and extends toward the pressing portion, wherein a rotation axis of the paddle is located at the central portion of the seat, and wherein the arm is curved toward a retraction direction that is a direction opposite to the unfolding direction.

In the comparative example in which the arm of the paddle is not curved in the retraction direction, it is not possible to largely displace the side support alone when the paddle is rotated in the unfolding direction. On the other hand, in the seat drive device having the above configuration, the arm of the paddle is curved in the retraction direction. Thus, the seat drive device can largely displace the side support alone when rotating the paddle in the unfolding direction. Therefore, the seat drive device can enhance the holding property of the user by the side support.

It is preferable that the arm is curved such that an intermediate portion of the arm in a longitudinal direction is located in the retraction direction relative to both end portions of the arm in the longitudinal direction.

When the paddle rotates in the unfolding direction, the arm tends to be difficult to push the seat. Thus, the seat drive device can more selectively displace only the side support when rotating the paddle in the unfolding direction.

The air bag includes a bag body that expands with supply of air and contracts with discharge of air, and an extension portion extending from the bag body toward a rotation axis of the paddle, and wherein the extension portion is locked to the base.

In the case of the comparative example in which the bag body is directly locked to the base, expansion and contraction of the air bag may be hindered due to the locking structure with respect to the base of the air bag. In this respect, in the seat drive device having the above configuration, the air bag is locked to the base via the extension portion. Therefore, the seat drive device can suppress the air bag being prevented from expanding and contracting due to the locking structure with respect to the base of the air bag.

The extension portion is locked to the base so as to be movable in a direction intersecting the rotation axis of the paddle with respect to the base.

The seat drive device can allow the air bag to move relative to the base when the air bag expands and contracts. Therefore, the seat drive device can further suppress the air bag being prevented from expanding and contracting due to the locking structure with respect to the base of the air bag.

When the bag body is a first bag body, the air bag includes a second bag body that is disposed between the first bag body and the paddle and expands and contracts together with the first bag body.

The seat drive device includes two bag bodies stacked between the base and the paddle.

Therefore, the seat drive device can displace the side support more largely by the expansion of the two bag bodies. The extension portion extends from the first bag body close to the base. Therefore, in the seat drive device, the length of the extension portion can be shortened.

The paddle includes the arm and the pressing portion configured separately.

When the shape of the side support of the seat is different, the shape of the paddle suitable for the side support is also different. In this respect, in the paddle of the seat drive device, the pressing portion and the arm are configured separately. Therefore, the seat drive device can select an optimum pressing portion from a plurality of pressing portions having different shapes, or select an optimum arm from a plurality of arms having different shapes.

The base includes two guide walls sandwiching the arm in a direction in which a rotation axis of the paddle extends.

The seat drive device can suppress movement of the arm in a direction different from the rotation direction when the paddle rotates.

Under a situation where the paddle rotates most in the retraction direction, a curved portion of the arm penetrates the base in the retraction direction.

Even when the paddle rotates in the unfolding direction, the arm is more easily disposed in the retraction direction than the pressing portion. Therefore, in the seat drive device, when the paddle is rotated in the unfolding direction, the side support can be largely displaced by the pressing portion, and large displacement of the seat by the arm can be suppressed.

The arm includes two arms disposed with a space therebetween in a direction in which the rotation axis of the paddle extends, and wherein the extension portion is locked to the base between rotation regions of the two arms.

The seat drive device includes two arms. Thus, the seat drive device can stabilize the rotation of the paddle. The extension portion of the air bag is locked to the base between the rotation regions of the two arms. Thus, the seat drive device can suppress the extension portion of the air bag hindering the rotation of the paddle.

The curved portion of the arm penetrates the base in the retraction direction under a situation where the paddle rotates most in the retraction direction, wherein the extension portion is locked to the base in a state where a distal end of the extension portion penetrates the base in the retraction direction, and wherein when viewed in a direction in which the rotation axis of the paddle extends under a situation where the paddle rotates most in the retraction direction, the distal end of the extension portion is hidden by a portion of the two arms, the portion penetrating the base in the retraction direction.

Since the extension portion of the air bag is locked to the base in a state of penetrating the base in the retraction direction, the air bag is likely to be hardly detached from the base even when the air bag repeats expansion and contraction. In addition, under the situation where the paddle rotates most in the retraction direction, the distal end of the extension portion is hidden by a portion of the two arms, the portion penetrating the base in the retraction direction. For this reason, when the components inside the seat are disposed to avoid interference with the two arms, the components are less likely to come into contact with the distal end of the extension portion. As a result, the seat drive device can suppress detachment of the extension portion from the base due to contact with the internal components of the seat.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat drive device that is built in a seat including a central portion and a side support located outside the central portion in a width direction, and drives the side support, the seat drive device comprising:
   a base fixed to the seat;
   a paddle that is rotatably supported with respect to the base and configured to rotate in an unfolding direction to displace the side support toward a seating region of a user; and
   an air bag disposed between the base and the paddle, wherein the air bag is configured to rotate the paddle in the unfolding direction when it is expanded by an air supply,
      wherein the paddle includes a pressing portion that is configured to press the side support from inside upon rotation in the unfolding direction, and
      an arm that is rotatably supported with respect to the base and extends toward the pressing portion,
      wherein a rotation axis of the paddle is located in a central portion of the seat,
      wherein the arm is curved toward a retraction direction that is a direction opposite to the unfolding direction, and
      wherein the seat drive device includes a fully retracted position, and the curved portion of the arm is configured to penetrate the base when the seat drive device is in the fully retracted position.

2. The seat drive device according to claim 1, wherein the arm is curved such that an intermediate portion of the arm in a longitudinal direction is located in the retraction direction relative to both end portions of the arm in the longitudinal direction.

3. The seat drive device according to claim 1, wherein the air bag includes a bag body that is configured to expand with supply of air and is configured to contract with discharge of air, and an extension portion extending from the bag body toward a rotation axis of the paddle, and wherein the extension portion is locked to the base.

4. The seat drive device according to claim 3, wherein the extension portion is locked to the base, and wherein the extension portion is configured to be movable in a direction intersecting the rotation axis of the paddle with respect to the base when the extension portion is unlocked.

5. The seat drive device according to claim 4, wherein the bag body includes a first bag body and a second bag body, and wherein when second bag body that is disposed between the first bag body and the paddle, and the second bag body is configured to expand and contract together with the first bag body.

6. The seat drive device according to claim 1, wherein the paddle includes the arm and the pressing portion configured separately.

7. The seat drive device according to claim 1, wherein the base includes two guide walls sandwiching the arm in a direction in which the rotation axis of the paddle extends.

8. The seat drive device according to claim 3, wherein the arm includes two arms disposed with a space therebetween in a direction in which the rotation axis of the paddle extends, and wherein the extension portion of the air bag is locked to the base between the two arms.

9. The seat drive device according to claim 8, wherein the curved portion of the arm is configured to penetrate the base in the retraction direction when the seat drive device is in the fully retracted position, wherein the extension portion is locked to the base in a state where a distal end of the extension portion penetrates the base when the seat drive device is in the fully retracted position, and wherein when the seat is in the fully retracted position and is viewed in cross-section, a portion of the two arms hides the distal end of the extension portion of the air bag.

10. The seat drive device according to claim 2, wherein the air bag includes a bag body that is configured to expand with supply of air and is configured to contract with discharge of air, and an extension portion extending from the bag body toward a rotation axis of the paddle, and wherein the extension portion is locked to the base.

11. The seat drive device according to claim 10, wherein the extension portion is locked to the base, and wherein the extension portion is configured to be movable in a direction intersecting the rotation axis of the paddle with respect to the base when the extension portion is unlocked.

12. The seat drive device according to claim 11, wherein the bag body includes a first bag body and a second bag body, and wherein when second bag body is disposed between the first bag body and the paddle, and the second bag body is configured to expand and contract together with the first bag body.

13. The seat drive device according to claim 10, wherein the arm includes two arms disposed with a space therebetween in a direction in which the rotation axis of the paddle extends, and wherein the extension portion of the air bag is locked to the base between the two arms.

14. The seat drive device according to claim 13, wherein the curved portion of the arm is configured to penetrate the base in the retraction direction when the seat drive device is in the fully retracted position, wherein the extension portion is locked to the base in a state where a distal end of the extension portion penetrates the base when the seat drive device is in the fully retracted position, and wherein when the seat is in the fully retracted position and is viewed in cross-section, a portion of the two arms hides the distal end of the extension portion of the air bag.

15. The seat drive device according to claim 2, wherein the paddle includes the arm and the pressing portion configured separately.

16. The seat drive device according to claim 2, wherein the base includes two guide walls sandwiching the arm in a direction in which the rotation axis of the paddle extends.

\* \* \* \* \*